3,205,245
MERCURATED CYCLOPENTADIENYL MANGANESE TRICARBONYLS

John Kozikowski, Walled Lake, Mich., and Michael Cais, Haifa, Israel, assignors to Ethyl Corporation, New York, N.Y., a corporation of Virginia
No Drawing. Original application Aug. 12, 1960, Ser. No. 49,135. Divided and this application May 13, 1963, Ser. No. 283,139
12 Claims. (Cl. 260—432)

This application is a division of our co-pending application Serial No. 49,135 filed August 12, 1960.

This invention relates to a variety of organometallic compounds and the processes employed in their production. More specifically, this invention relates to compounds and processes involving the use of a cyclopentadienyl sulfonic acid manganese tricarbonyl compound.

An object of our invention is to provide new organometallic compounds and processes for their preparation. A further object is to provide cyclopentadienyl manganese tricarbonyl derivatives and processes for their preparation. Additional objects will become apparent from a reading of the specification and claims which follow.

A first feature of our invention involves the sulfonation of cyclopentadienyl manganese tricarbonyl compounds according to the following reaction:

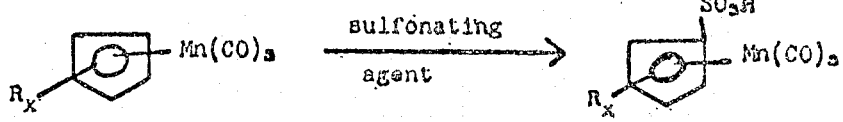

The cyclopentadienyl sulfonic acid manganese tricarbonyl compound is easily separated from the reaction mixture by treating the reaction mixture with a basic material which forms an insoluble salt of the sulfonic acid. In the above reaction, the cyclopentadienyl group may be substituted with R groups which are univalent hydrocarbons containing from one to about eight carbon atoms. $x$ is an integer ranging from zero to three. The reaction conditions are not critical, although preferably the reaction is performed below about 60° C. A preferred form of this reaction is set forth in the following example in which all parts and percentages are by weight unless otherwise indicated.

EXAMPLE I

To a suspension of cyclopentadienylmanganese tricarbonyl (306 g., 1.5 moles) in acetic anhydride (400 ml.) there was added dropwise over one hour with continuous stirring 100 percent sulfuric acid (220 g., 2.2 moles) keeping the temperature at 25–30°. As the addition of sulfuric acid proceeded, all the solid went into solution and the latter became very dark. Stirring was continued at room temperature for two hours after the addition was completed and then, after raising the temperature to 60°, for one hour at 55–60°.

The cooled mixture was poured over ice, allowed to stand for one hour and then filtered. A small amount (5 g.) of insoluble precipitate was collected which was shown by melting point and infrared spectrum to be the starting material. The dark colored filtrate (2 liters) was mixed with a solution of p-toluidine (170 g.) in water (700 ml.) and conc. hydrochloric acid (150 ml.). A cream-colored precipitate which was the (sulfocyclopentadienyl) manganese tricarbonyl-p-toluidine salt formed instantaneously. This was filtered, washed with ice-water and air dried to yield a solid (540 g., 93 percent yield) of M.P. 204–207°.

Recrystallization from absolute ethanol afforded the analytical sample, pale yellow needles of M.P. 209–210°.

*Analysis.*—Calcd. for $C_{15}H_{14}MnNOS_6$: C, 46.0; H, 3.60; Mn, 14.0; S, 8.22. Found: C, 46.4; H, 3.88; Mn, 13.7; S, 8.56.

In another experiment, under slightly different conditions, 32 percent of the starting material was recovered, and the yield of the (sulfocyclopentadienyl) manganese tricarbonyl-p-toluidine salt, calculated on reacted material, was quantitative.

The cyclopentadienyl sulfonic acid manganese tricarbonyl compound can be separated from the p-toluidine salt in Example I by treating the salt with sulfuric acid. The liquid mixture which is formed is decanted to remove the solution from the sulfonic acid product which, when dried under reduced pressure, yields pure cyclopentadienyl sulfonic acid manganese tricarbonyl.

A wide variety of sulfonic acid salts of a cyclopentadienyl sulfonic acid manganese tricarbonyl can be made

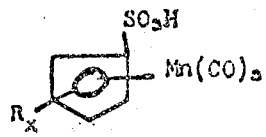

according to our invention. This is accomplished by treating the sulfonic acid with a base, or, for example, by treating the p-toluidine salt obtained in Example I with a base which is stronger than p-toluidine. Typical of such bases are sodium hydroxide, lithium hydroxide, potassium hydroxide and the like. To illustrate, there is presented the following example.

EXAMPLE II

The cyclopentadienyl sulfonic acid manganese tricarbonyl p-toluidine salt obtained in Example I was heated for a short time with an aqueous solution of potassium hydroxide after which it was filtered, cooled, and the filtrate was saturated with potassium chloride. The potassium salt of cyclopentadienyl sulfonic acid manganese tricarbonyl salted out as pale yellow plates. Heating to 260° C. did not melt the crystals. They were recrystalized from ethanol to give an analytical sample. Found: C, 29.8; H, 1.34; Mn, 16.9; S, 10.1 percent. Calculated for $C_8H_4KMnO_6S$: C, 29.8; H, 1.21; Mn, 17.1; S, 9.94 percent.

Another facet of our invention involves the reaction of a cyclopentadienyl sulfonic acid manganese tricarbonyl compound or its salt with a halogenating agent such as phosphorus pentachloride, thionyl chloride or benzotrichloride. There is produced the corresponding cyclopentadienyl sulfonyl halide manganese tricarbonyl. The reaction for the salt can be illustrated as follows:

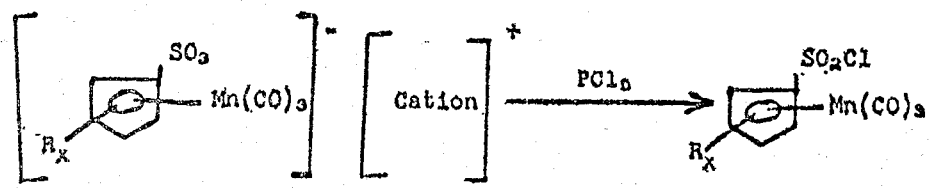

Although the reaction conditions are not critical, the temperature employed preferably ranges from about room temperature to about 100° C. Although not necessary, an inert solvent can be employed if desired. To further illustrate this aspect of our invention, there is presented the following example in which all parts and percentages are by weight unless otherwise indicated.

EXAMPLE III

A mixture of crude, dry (sulfocyclopentadienyl) manganese tricarbonyl-p-toluidine salt (70 g.) and phosphorus pentachloride (70 g.) was stirred vigorously for ten minutes at room temperature; heat was evolved and a viscous liquid was formed. The mixture was then heated gently, with stirring, on the steam bath for 45 minutes. After cooling, benzene (500 ml.) was added to the reaction mixture, stirred well and poured over ice; allowed to stand for one hour and filtered. The benzene layer was separated, washed once with water, mixed with anhydrous sodium sulfate and activated charcoal (Norit–A, Pfanstiehl Chemical Co.) allowed to stand for 30 minutes and filtered. The benzene solution was concentrated to a small volume, diluted with petroleum ether and the precipitate formed was filtered off to collect 54 g. of yellow crystals (quantitative yield) of M.P. 95–105°.

One recrystallization from carbon tetrachloride afforded the analytical sample, M.P. 112–113°, of (chlorosulfonyl cyclopentadienyl) manganese tricarbonyl.

*Analysis.*—Calcd. for $C_{84}ClMnO_5S$: C, 31.7; H, 1.33; Mn, 18.1; S, 10.5. Found: C, 31.6; H, 1.38; Mn, 17.8; S, 10.7.

A further form of our invention involves the reaction of a cyclopentadienyl sulfonyl halide manganese tricarbonyl, as illustrated in the previous example, with a primary or secondary amine. The reaction conditions employed are not critical, and the temperature and pressure used are dependent on the nature of the amine reactant. Thus, if the amine reactant is a gas as in the case of dimethylamine or nitrogen, the reaction is performed under pressure and at a relatively low temperature. On the other hand, with an amine which is a high boiling liquid, the reaction is performed at higher temperatures, and pressure is not necessary. Preferably, moisture is excluded from the reaction mixture since it tends to decrease the yield by reacting with the sulfonyl halide reactant. As an illustration of this form of our invention, there is presented the following example.

EXAMPLE IV

The (cyclopentadienyl sulfonyl chloride) manganese tricarbonyl compound of Example III (3 gm.) and p-toluidine (3 gm.) were mixed together and heated on a steam bath until a melt was formed. Ethanol (50 ml.) was then added, the mixture heated to reflux for 15 minutes, cooled, diluted with potassium hydroxide aqueous solution and filtered. The filtrate was acidified with hydrochloric acid and the precipitate formed collected by filtration. Yield 2 g. of yellow powder, M.P. 197–199° which was [(p-tolylsulfamoyl) cyclopentadienyl] manganese tricarbonyl. One crystallization from ethanol afforded yellow crystals, M.P. 199–201.

*Analysis.*—Calcd. for $C_{15}H_{12}MnNO_5S$: C, 48.2; H, 3.27; Mn, 14.7; S. 8.6 Found: C, 48.5; H, 3.39; Mn, 14.5; S, 9.2.

A further form of our invention involves the reaction of a cyclopentadienyl sulfonyl halide manganese tricarbonyl compound having the formula

with an aromatic compound under Friedel Crafts conditions. In the above formula, X is a halogen, R is a univalent hydrocarbon group containing from one to about eight carbon atoms, and x is an integer ranging from zero to three. The aromatic compound which is reacted with the sulfonyl halide reactant may be substituted provided that the substituent groups are ortho and para-directing. To further illustrate this reaction, there is presented the following example.

EXAMPLE V (Chlorosulfonyl - cyclopentadienyl)manganese tricarbonyl (3 g., 0.01 mole), anisole (7 g.) which also serve as solvent, and aluminum chloride (3 g.) were refluxed together, with stirring, for 30 minutes. After cooling, the mixture was poured over ice and extracted with ether. The ether extract, after drying (sodium sulfate) was evaporated to dryness (water-pump vacuum and steam bath heating). The brown residue was dissolved in hot methanol (50 ml.), boiled with activated carbon (Norit–A), and the filtrate was concentrated on the steam bath until the appearance of crystals. After cooling and filtering, one gram of yellow crystalline [(o-methoxy-phenylsulfonyl)cyclopentadienyl] manganese tricarbonyl was obtained, M.P. 130–152°, which after two more recrystallizations from methanol yielded 0.3 g., M.P. 186–188°.

*Analysis.*—Calcd. for $C_{15}H_{11}MnO_6S$: C, 48.1; H, 2.94; Mn, 14.7. Found: C, 48.3; H, 3.04; Mn, 14.9.

The methanol mother liquor from the original filtration was further concentrated and on cooling yielding 0.8 g. of yellow crystals, M.P. 120–132°. One recrystallization from benzene petroleum ether afforded 0.5 g. of crystalline [(p-methoxyphenylsulfonyl)cyclopentadienyl] manganese bands in the $1100$ cm.$^{-1}$ and $1300$ cm.$^{-2}$ regions.

*Analysis.*—Found: C, 48.1; H, 2.97; Mn, 14.8.

The infrared spectra of the two isomers were similar but not identical. The main differences occured in the "finger print" region (above 900 cm.$^{-1}$) but some significant differences could be observed even at the lower frequencies. Both isomers exhibited the typical sulfone bands in the 1100 cm.$^{-1}$ and 1300 cm.$^{-1}$ regions.

A still further form of our invention involves the reaction between a cyclopentadienyl sulfonyl halide manganese tricarbonyl as described above with a reducing agent to form an intermediate salt which is then acidified to form the cyclopentadienyl sulfinic acid manganese tricarbonyl. The reaction conditions are not critical although preferably, the reaction is carried out in an aqueous system. To illustrate the preparation of the sulfinic acid, there is presented the following example.

EXAMPLE VI (Chlorosulfonyl - cyclopentadienyl)manganese tricarbonyl, (12 g.), sodium sulfite (24 g.) and water (200 ml.) were stirred together for two hours at room temperature. The mixture was then filtered and the clear yellow solution acidified with 60 percent sulfuric acid (50 ml.). Upon standing for one hour a yellow precipitate was formed which upon filtration yielded 9 g. (theoretical yield) of yellow crystalline (sulfino cyclopentadienyl)-manganese tricarbonyl of M.P. 95–105°. If the filtered reaction mixture was not acidified, but allowed to stand at room temperature for 16 hours the sodium sulfinate salt crystallized out. One recrystallization of the sodium sulfinate from methanol afforded crystals with M.P. 213–215°.

*Analysis.*—Calcd. for $C_8H_4MnNaO_5S$: C, 33.1; H, 1.40; Mn, 18.9; S, 11.3. Found: C, 32.6; H, 1.66; Mn, 18.8; S, 11.3.

A further form of our invention involves reaction of a cyclopentadienyl sulfinic acid manganese tricarbonyl compound having the formula

with a quinone having at least one unsubstituted position.

As an illustration of this reaction, there is presented the following example in which all parts and percentages are by weight unless otherwise indicated.

EXAMPLE VII

Three and one-half grams of (sulfinocyclopentadienyl) manganese tricarbonyl in 50 ml. of ethanol was mixed with a solution of technical grade p-benzoquinone (1.5 grams) in 50 ml. of ethanol. The mixture was heated for 10 minutes on the steam bath, and was cooled and diluted with 400 ml. of water containing a few drops of concentrated hydrochloric acid. The brown precipitate which formed was filtered off, dissolved in ether, and boiled with activated carbon (Norit–A, produced by Pfanstiehl Chemical Company). The mixture was then filtered, and the filtrate was dried over sodium sulfate and diluted with pretroleum ether. There was obtained 2.5 grams of a cream-colored precipitate having a melting point of 197–199° C. The mother liquor filtrate was evaporated and the residue, after crystallization from benzene, yielded an additional 0.9 gram of the cream-colored crystals having a melting point of 197–199° C. The total yield of product was 70.5 percent. An analytical sample was obtained by an additional recrystallization from benzene and had a melting point of 198–199° C. This product was proved to be [(2,5-dihydroxyphenyl-sulfonyl) cyclopentadienyl] manganese tricarbonyl. Found: C, 45.0; H, 2.50; Mn, 14.5; S, 8.72 percent. Calculated for $C_{14}H_8MnO_7S$: C, 44.7; H, 2.41; Mn, 14.6; S, 8.52 percent. The infrared spectrum of the product in KBr pellet showed the two typical strong sulfone bands in the 1100 cm.$^{-1}$ and 1300 cm.$^{-1}$ regions.

A further form of our invention involves the reaction between a cyclopentadienyl sulfinic acid manganese tricarbonyl, as defined previously, with a mercurating agent which is preferably mercuric chloride. The compounds formed from this reaction have mercury substituted in the cyclopentadienyl ring which is bonded to the manganese tricarbonyl moiety. To illustrate this form of our invention, there is presented the following example.

EXAMPLE VIII (Sulfinocyclopentadienyl)manganese tricarbonyl (0.7 gm. 0.0026 mole) dissolved in a mixture of ethanol (30 ml.) and water (20 ml.) was refluxed for 45 minutes with a solution of mercuric chloride (1.5 g., 0.0055 mole) in ethanol (10 ml.) and water (10 ml.). The solution was then filtered hot and part of the solvent was removed under vacuum (water pump), until crystals began to appear. On cooling and filtering there was obtained 0.9 g. (79.5 percent yield) of yellow crystalline (chloromercuricyclopentadienyl)manganese tricarbonyl having a M.P. of 135–136°. One recrystallization from ethanol did not produce any change in the melting point.

Analysis.—Calcd. for $C_8H_4ClHgMnO_3$: C, 21.9; H, 0.92; Mn, 12.5. Found: C, 22.0; H, 1.04; Mn, 12.5.

The mercurated cyclopentadienyl manganese tricarbonyl compounds, as illustrated by the previous example and preferably having the formula

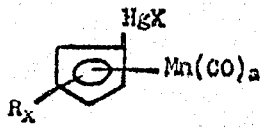

in which R is a univalent hydrocarbon containing from one to about eight carbon atoms, $x$ is an integer ranging from zero to three, and X is an anion, preferably halogen, may be reduced. Typical of the reducing agents which may be employed is n-butyl lithium. There is formed from this recation a mercury-bridged bis(cyclopentiadienyl manganese tricarbonyl) compound having the formula:

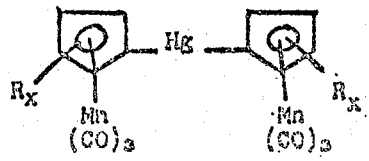

In this formula, R and $x$ have the meaning previously defined. To illustrate the preparation of these compounds, there is presented the following example.

EXAMPLE IX

To an ether suspension of n-butyllithium [prepared from 1.4 g. (0.01 mole) n-butyl bromide] was added with stirring, at 10–15°, (chloromercuricyclopentadienyl) manganese tricarbonyl (4.3 g., 0.01 mole) and stirring was continued at this temperature for one hour. The mixture was then poured over solid carbon dioxide, allowed to stand for one hour and filtered. The ether filtrate was washed once with water, dried over sodium sulfate and concentrated to a small volume, until crystals began to appear. On cooling and filtering 1.5 g. of solid bis(cyclopentadienyl manganese tricarbonyl) mercury, M.P. 160–164°, was obtained. Two recrystallizations from benzene, or carbon tetrachloride, gave the analytical sample M.P. 178–179°.

Analysis.—Calcd. for $C_{16}H_8HgMn_2O_6$: C, 31.6; H, 1.32; Mn, 18.1; Hg, 33.0. Found: C, 31.9; H, 1.67; Mn, 17.7; Hg, 32.2.

A further form of our invention involves the preparation of a wide variety of cyclopentadienyl manganese tricarbonyl sulfone compounds. These compounds are formed by reacting a cyclopentadienyl sulfinic acid manganese tricarbonyl, as previously defined, with an alkali metal hydroxide or an alkali metal salt of an acid which is weaker than the cyclopentadienyl sulfinic acid manganese tricarbonyl reactant. As a result, there is formed a salt having the formula

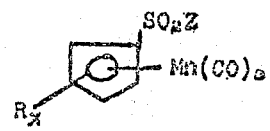

in which R is a univalent hydrocarbon group containing from one to eight carbon atoms, $x$ is an integer ranging from zero to three, and Z is an alkali metal. The intermediate salt is then reacted with an alkyl halide or an aralkyl halide which may be substituted or unsubstituted. This process is illustrated by way of the following reaction:

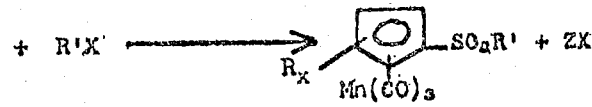

In the above reaction, R' is an alkyl or aralkyl group, and X is a halogen. The reaction conditions employed are not critical and the alkyl or aralkyl halide, when used in sufficient excess, may itself serve as the solvent. To further illustrate this form of our invention, there is presented the following general example and tables which summarize the results obtained from several such reactions.

EXAMPLE X

The sodium salt derivative of cyclopentadienyl sulfinic acid manganese tricarbonyl was dissolved in ethanol and refluxed with a slight excess of the alkyl or aralkyl halide. The cooled mixture was filtered to remove the soduim halide which formed, and the ethanolic filtrate was concentrated by heating until crystals began to appear. After cooling, the crystals were collected and were generally of a high degree of purity. An additional crop of crystals could be obtained by diluting the ethanolic mother liquor with water.

Following the general procedure set forth in the preceding example, the results were obtained as set forth in the following Table I. The analyses obtained for the compounds of Table I are set forth in Table II.

EXAMPLE XI

To a solution comprising 24.6 grams of acetylcyclopentadienyl manganese tricarbonyl in 250 ml. of ether cooled to 0° C. was added 16.0 grams of bromine. The bromine was added dropwise with stirring over a one-half hour period. Stirring was continued for an additional one-half hour after which the ether and hydrogen bromide were removed by distillation of the reaction

*Table I*

| R'—X | Reflux time, hrs. | Compound obtained | Yield percent | M.P., ° C. | Recrystn. solvent |
|---|---|---|---|---|---|
| $CH_3I$ | 2 | [(Methylsulfonyl)cyclopentadienyl] manganese tricarbonyl. | 97 | 156–158 | B.[a] |
| $ClCH_2[(CH_3)_3C]_2C_5H_2OH$ [b] | 20 | [(3,5-di-tert-butyl-4-hydroxybenzylsulfonyl)cyclopentadienyl] manganese tricarbonyl. | 84 | 170–171 | E.[a] |
| $CH_3COCH_2Cl$ [c] | 2 | [(Acetonylsulfonyl)cyclopentadienyl] manganese tricarbonyl. | 75 | 123–124 | B. |
| $BrCH_2COC_5H_4Mn(CO)_3$ [d] | 3 | {{[(Tricarbonylmanganese)cyclopentadienyl]carbonylmethylsulfonyl} cyclopentadienyl} manganese tricarbonyl. | 94 | 167–168 | E/B. |

[a] B—benzene; E—ethanol.
[b] 2,6-di-tert-butyl-α-Chloro-p-cresol.
[c] The 2,4-dinitrophenylhydrazone of [(p-methoxyphenylsulfonyl)cyclopentadienyl] manganese tricarbonyl formed very readily, M.P. 190–191° (from chloroform/methanol). Analysis, Calcd. for $C_{17}H_{13}MnH_4O_9S$: C, 40.4; H, 2.57; Mn, 10.9. Found: C, 40.5; H, 2.60; Mn, 10.9.
[d] (Bromoacetylcyclopentadienyl) manganese tricarbonyl.

*Table II*

| Compounds | Carbon Calcd. | Percent Found | Hydrogen Calcd. | Percent Found | Manganese Calcd. | Percent Found | Sulfur Calcd. | Percent Found |
|---|---|---|---|---|---|---|---|---|
| [(Methylsulfonyl)cyclopentadienyl] manganese tricarbonyl | 38.3 | 37.9 | 2.50 | 2.42 | 19.4 | 19.4 | 11.3 | 11.6 |
| [(3,5-di-tert-butyl-4-hydroxybenzylsulfonyl) cyclopentadienyl] manganese tricarbonyl | 56.8 | 56.8 | 5.63 | 5.66 | 11.3 | 11.3 | 6.6 | 6.6 |
| [(Acetonylsulfonyl)cyclopentadienyl] manganese tricarbonyl | | | | | 16.9 | 16.9 | | |
| {{[(Tricarbonylmanganese)cyclopentadienyl] carbonylmethylsulfonyl} cyclopentadienyl} manganese tricarbonyl | 42.1 | 42.2 | 1.95 | 2.19 | 21.4 | 21.5 | 6.28 | 6.24 |

Bromoacetylcyclopentadienyl manganese tricarbonyl, which was employed as a reactant, as reported in Table I, was prepared by reacting an acylcyclopentadienyl manganese tricarbonyl compound having the formula

in which R is a univalent hydrocarbon radical containing from one to about eight carbon atoms and $x$ is an integer ranging from zero to three, with a halogenating agent. In the specific case of the bromoacetyl compound, the halogenating agent was bromine. Analogous compounds such as the chloroacetylcyclopentadienyl manganese tricarbonyl and iodoacetylcyclopentadienyl manganese tricarbonyl compounds are prepared by reaction of chlorine or iodine with an acetylcyclopentadienyl manganese tricarbonyl compound. The reaction can be conducted in any inert solvent, although preferably, the solvent is polar and most preferably, it is an ether. The reaction is conducted at low temperatures in the order of about 0° C. To illustrate the reaction, there is presented the following example.

mixture at reduced pressure. The yellow-orange compound (bromoacetylcyclopentadienyl manganese tricarbonyl) which remained was recrystallized from ether and was found to be soluble in organic solvents. The yield was 27 grams of bromoacetylcyclopentadienyl manganese tricarbonyl or 83 percent of theory. The compound had a melting point of 75–77° C. and on analysis there was found: C, 37.1; H, 1.93; Mn, 17.0; Br, 24.8 percent. Calculated for $C_{10}H_6MnO_4Br$: C, 36.9; H, 1.85; Mn, 16.9; Br, 24.6 percent.

A further embodiment of our invention concerns reaction of compounds having the formula:

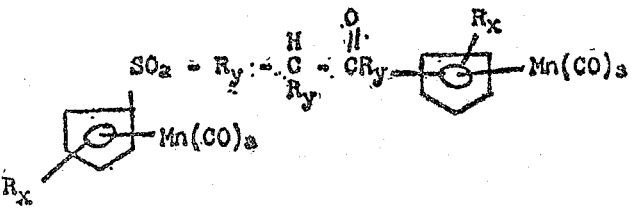

These compounds are made, as in the case of the {[(tricarbonylmanganese) cyclopentadienyl] carbonylmethylsulfonyl} cyclopentadienyl manganese tricarbonyl reported in Table I and II, from reaction of the alkali metal salt of a cyclopentadienyl sulfinic acid manganese tricarbonyl with an appropriate haloacylcyclopentadienyl manganese tricarbonyl compound. In the above formula, the group R is a univalent hydrocarbon containing from one to about eight carbon atoms, $x$ is an integer ranging from zero to three, and $y$ is either zero or one. The above compounds are reacted with a base such as sodium hydroxide and a hydroxyl-containing solvent such as water or an alcohol such as ethanol to form a [(hydrocarbylsulfone) cyclopentadienyl] manganese tricarbonyl and the alkali metal salt of a cyclopentadienylcarboxylicacid manganese tricarbonyl. These compounds have the respective formulae:

(I)

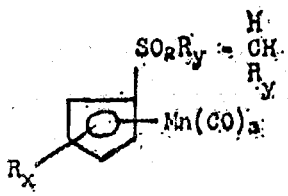

and

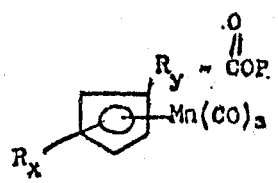

(II)

In the latter formula (II), P is an alkali metal.

In Formulae I and II, R is a univalent hydrocarbon group containing from one to about eight carbon atoms, $x$ is an integer ranging from zero to three, and $y$ is either zero or one.

The alkali metal salt of the cyclopentadienyl carboxylic acid manganese tricarbonyl is readily separated from the cyclopentadienyl sulfone manganese tricarbonyl compound by means of extraction. The alkali metal salt is then acidified to form the carboxylic acid compound which is insoluble in an aqueous medium and can be filtered off.

To further illustrate this embodiment of our invention, there is presented the following example.

EXAMPLE XII

Four grams of [{[(tricarbonylmanganese)cyclopentadienyl]carbonylmethylsulfonyl} cyclopentadienyl] manganese tricarbonyl, two grams of potassium hydroxide, 50 ml. of ethanol and 20 ml. of water were refluxed for 15 hours, cooled and poured into 400 ml. of water. Crystalline plates separated out and were filtered to yield 1.5 grams of a solid which was identified as [(methylsulfonyl)cyclopentadienyl] manganese tricarbonyl.

The aqueous filtrate was acidified with hydrochloric acid and the solid which precipitated was filtered off. The solid precipitate was recrystallized from benzene to give 1.8 grams (93 percent yield) of cyclopentadienyl carboxylic acid manganese tricarbonyl as yellow needle-like crystals having a melting point of 194–195° C. The compound was identified by means of its infrared spectrum and analysis. Found: Mn, 22.1 percent. Calculated: Mn, 22.2 percent.

Among the important uses of our compounds is their use as fuel and oil additives. For example, they are useful antiknocks when added to gasoline. They may be used as primary antiknocks in which they are the major antiknock component in the fuel or as supplemental antiknocks. When used as supplemental antiknocks, they are present as the minor antiknock component in the fuel in addition to a primary antiknock such as a tertiaryalkyllead compound. Typical alkyllead compounds are tetraethyllead, tetrabutyllead, tetramethyllead and various mixed lead alkyls such as dimethyldiethyllead, diethyldibutyllead and the like. When used as either a supplemental or primary antiknock, our compounds may be present in the gasoline in combination with typical scavengers such as ethylene dichloride, ethylenedibromide, tricresylphosphate, trimethylphosphate and the like.

The compounds of our invention have further utility as additives to residual and distillate fuels generally, e.g., jet fuels, home heater fuels and diesel fuels, to reduce smoke and/or soot formation. Also, they may be employed as additives to lubricating oils in which case they act to improve the lubricity of the base oil.

Our compounds are further useful in many metal plating applications. In order to effect metal plating using the compounds, they are decomposed in an evacuated space containing the object to be plated. On decomposition, they lay down a film of metal on the object. The gaseous plating may be carried out in the presence of an inert gas so as to prevent oxidation of the plating metal or the object to be plated during the plating operations.

The gaseous plating technique described above finds wide application in forming coatings which are not only decorative but also protect the underlying substrate material.

Deposition of metal on a glass cloth illustrates the applied process. A glass cloth band weighing one gram is dried for one hour in an oven at 150° C. It is then placed in a tube which is devoid of air and there is added to the tube 0.5 gram of [(methylsulfonyl)cyclopentadienyl] manganese tricarbonyl. The tube is heated at 400° C. for one hour after which time it is cooled and opened. The cloth has a uniform metallic grey appearance and exhibits a gain in weight of about 0.02 gram.

A further utility for our compounds is as drying agents in which case the compounds are incorporated in paints, varnish, printing inks, synthetic resins of the drying oil type, oil enamels and the like. A still further utility for our compounds is their use as chemical intermediates in the preparation of metal-containing polymeric materials or in the preparation of new organic materials.

Having fully defined the novel compounds of our invention, their mode of preparation and their many utilities, we desire to be limited only within the lawful scope of the appended claims.

We claim:

1. A process for the preparation of a halomercuricyclopentanedienyl manganese tricarbonyl having the formula:

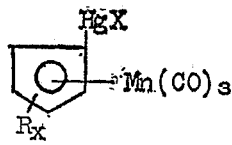

wherein R is a saturated univalent hydrocarbon radical containing from one to about eight carbon atoms, $x$ is an integer having a value of zero to three, and X is a halogen, said process comprising reacting a cyclopentadienyl sulfinic acid manganese tricarbonyl having the formula:

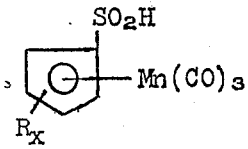

wherein R and $x$ are as defined above, with a mercuric dihalide.

2. The process of claim 1 wherein $x$ is equal to zero.

3. The process of claim 1 wherein said mercuric dihalide is mercuric dichloride.

4. The process of claim 3 being carried out in the presence of an inert solvent.

5. Process for the preparation of (chloromercuricyclopentadienyl) manganese tricarbonyl, said process comprising reacting cyclopentadienyl sulfinic acid manganese tricarbonyl with mercuric dichloride.

6. The process of claim 5 carried out in the presence of an inert solvent.

7. The process of claim 6 wherein said solvent is aqueous ethanol.

8. The process of claim 7 carried out at the reflux temperature of the system.

9. A compound having the formula:

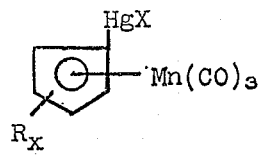

wherein R is a saturated univalent hydrocarbon radical having from one to eight carbon atoms, $x$ is an integer having a value of zero to three, and X is a halogen.

10. A compound of claim 7 wherein $x$ is equal to zero.

11. A compound of claim 9 wherein $x$ is chlorine.

12. (Chloromercuricyclopentadienyl)manganese tricarbonyl.

No references cited.

TOBIAS E. LEVOW, *Primary Examiner.*

UNITED STATES PATENT OFFICE
CERTIFICATE OF CORRECTION

Patent No. 3,205,245                 September 7, 1965

John Kozikowski et al.

It is hereby certified that error appears in the above numbered patent requiring correction and that the said Letters Patent should read as corrected below.

Column 2, line 11, for "$C_{15}H_{14}MnNOS_6$" read -- $C_{15}H_{14}MnNO_6S$ --; column 3, line 29, for "$C_{84}ClMnO_5S$" read -- $C_8H_4ClMnO_5S$ --; column 4, line 31, strike out "bands in the 1100 cm.$^{-1}$ and 1300 cm.$^{-2}$ regions." and insert instead -- tricarbonyl of M.P. 134-136°. --; columns 7 and 8, Table I, footnote "c" for "$C_{17}H_{13}MnH_4O_9S$" read -- $C_{17}H_{13}MnN_4O_9S$ --.

(SEAL)      Signed and sealed this 5th day of July 1966.

Attest:

ERNEST W. SWIDER
Attesting Officer

EDWARD J. BRENNER
Commissioner of Patents